United States Patent
Pierce

(10) Patent No.: US 7,606,684 B1
(45) Date of Patent: Oct. 20, 2009

(54) MODEL CREATION TOOL FOR ECONOMETRIC MODELS

(75) Inventor: Robert D. Pierce, Albany, CA (US)

(73) Assignee: SignalDemand, Inc., San Francisco, CA (US)

( * ) Notice: Subject to any disclaimer, the term of this patent is extended or adjusted under 35 U.S.C. 154(b) by 761 days.

(21) Appl. No.: 11/298,175

(22) Filed: Dec. 8, 2005

(51) Int. Cl.
*G06F 17/50* (2006.01)
*G06F 3/00* (2006.01)

(52) U.S. Cl. .............................. 703/2; 703/22; 702/189
(58) Field of Classification Search ...................... 703/2, 703/22; 702/189; 705/10; 706/46, 48
See application file for complete search history.

(56) References Cited

U.S. PATENT DOCUMENTS

| | | | |
|---|---|---|---|
| 6,879,971 B1 | 4/2005 | Keeler et al. | |
| 6,882,992 B1* | 4/2005 | Werbos | 706/48 |
| 6,928,398 B1 | 8/2005 | Fang et al. | |
| 7,251,589 B1* | 7/2007 | Crowe et al. | 702/189 |
| 2004/0054572 A1* | 3/2004 | Oldale et al. | 705/10 |
| 2004/0111220 A1* | 6/2004 | Ochs et al. | 702/19 |
| 2008/0086429 A1* | 4/2008 | Venkatraman et al. | 705/400 |
| 2008/0162212 A1* | 7/2008 | Clayton et al. | 705/7 |

* cited by examiner

*Primary Examiner*—Thai Phan
(74) *Attorney, Agent, or Firm*—Treyz Law Group; G. Victor Treyz; Nancy Y. Ru

(57) ABSTRACT

A model creation tool is provided that automatically evaluates potential econometric models and, given a set of historical data on which the model is intended to operate and other constraints, automatically identifies an optimum model. The optimum model may be an autoregressive model. The optimum model is defined by a set of optimum model parameters and optimum model coefficients. The optimum model parameters may include a model order such as an autoregressive model order, a seasonality function parameter, a trend function parameter, and a parameter that sets a tolerance that is used when performing principal components dimension reduction operations on the historical data.

12 Claims, 11 Drawing Sheets

|  | $t_{min}$ | $t_{min+1}$ | ... | $t_{max}$ |
|---|---|---|---|---|
| EXO_1 | X | X | ... | X |
| EXO_2 | X | X | | |
| ... | ... | ... | | |
| EXO_N | X | X | | |
| ENDOLAG | X | X | | |
| ... | ... | ... | | |
| ENDOLAG_R | X | X | | |
| SEASONAL_1 | X | X | | |
| ... | ... | ... | | |
| SEASONAL_P | X | X | | |
| TREND_1 | X | X | | |
| ... | ... | ... | | |
| TREND_Q | X | X | | |

FIG. 11

MODEL CREATION TOOL FOR ECONOMETRIC MODELS

BACKGROUND OF THE INVENTION

This invention relates to automatically creating optimized econometric models, and more particularly, to automatically creating a set of optimum model parameters and model coefficients for an econometric model.

Business planning models are used to assist organizations in maximizing profits. For example, a forecasting model may be used to predict what quantity of a product will be sold at some time in the future. By predicting demand in this way, the organization can order sufficient materials to produce the quantity of product that will be sold.

Demand forecasts of this type are useful, but do not take account of supply and demand factors in an integrated fashion. For example, conventional demand forecasts do not take into account the different profit margins of products that can be assembled from the same parts.

As a result, econometric models such as price optimization models are being developed that allow organizations to better maximize profit or revenue or to optimally achieve other business goals. A price optimization model uses historical data to estimate the demand elasticity and temporal dynamics for various products. The price optimization model can then determine which products an organization should assemble from available parts and what prices should be charged for each of these products. A price optimization model of this type takes into account supply constraints while determining which prices will generate appropriate levels of demand to maximize overall profit or revenue or to satisfy other business goals.

The process of developing econometric models such as price optimization models can be difficult. Models are typically hand-crafted by economic consultants. If a company has numerous products for which models are required, the consultant must generally handle each modeling project separately. A consultant who is inexperienced may not select the most appropriate mathematical formulation for a model, leading to forecasting inaccuracies.

What is needed are tools to automatically generate optimum econometric models.

SUMMARY OF THE INVENTION

In accordance with the present invention, a model creation tool is provided. The model creation tool automatically evaluates the performance of various econometric models in making forecasts using a given set of historical data. The model creation tool evaluates an error metric for various points in model parameter space. For each set of trial model parameters, the model creation tool estimates model coefficients. The performance of each trial model is evaluated by using the model creation tool to automatically evaluate the value of an error metric. The model creation tool can identify optimum model parameters for the model to use such as an optimum autoregressive model order, an optimum seasonality function, an optimum trend function, and an optimum tolerance value to use in performing principal components reduction operations. The tool also identifies optimum model coefficients.

In general, econometric models approximate stochastic processes, i.e., randomly varying quantities. The model creation tool uses an empirical approach that is not restricted to modeling stationary processes and that does not restrict the values of the model coefficients. The model creation tool may be used in econometric modeling schemes in which an autoregressive (AR) model or other model type is being selected. The model may be used to model prices in a commodity market or to make other suitable forecasts.

Further features of the invention, its nature and various advantages will be more apparent from the accompanying drawings and the following detailed description of the preferred embodiments.

BRIEF DESCRIPTION OF THE DRAWINGS

FIG. 11 is a diagram of an illustrative regression matrix used during the operations of FIG. 10 in accordance with the present invention.

DETAILED DESCRIPTION OF THE PREFERRED EMBODIMENTS

Figure 1:
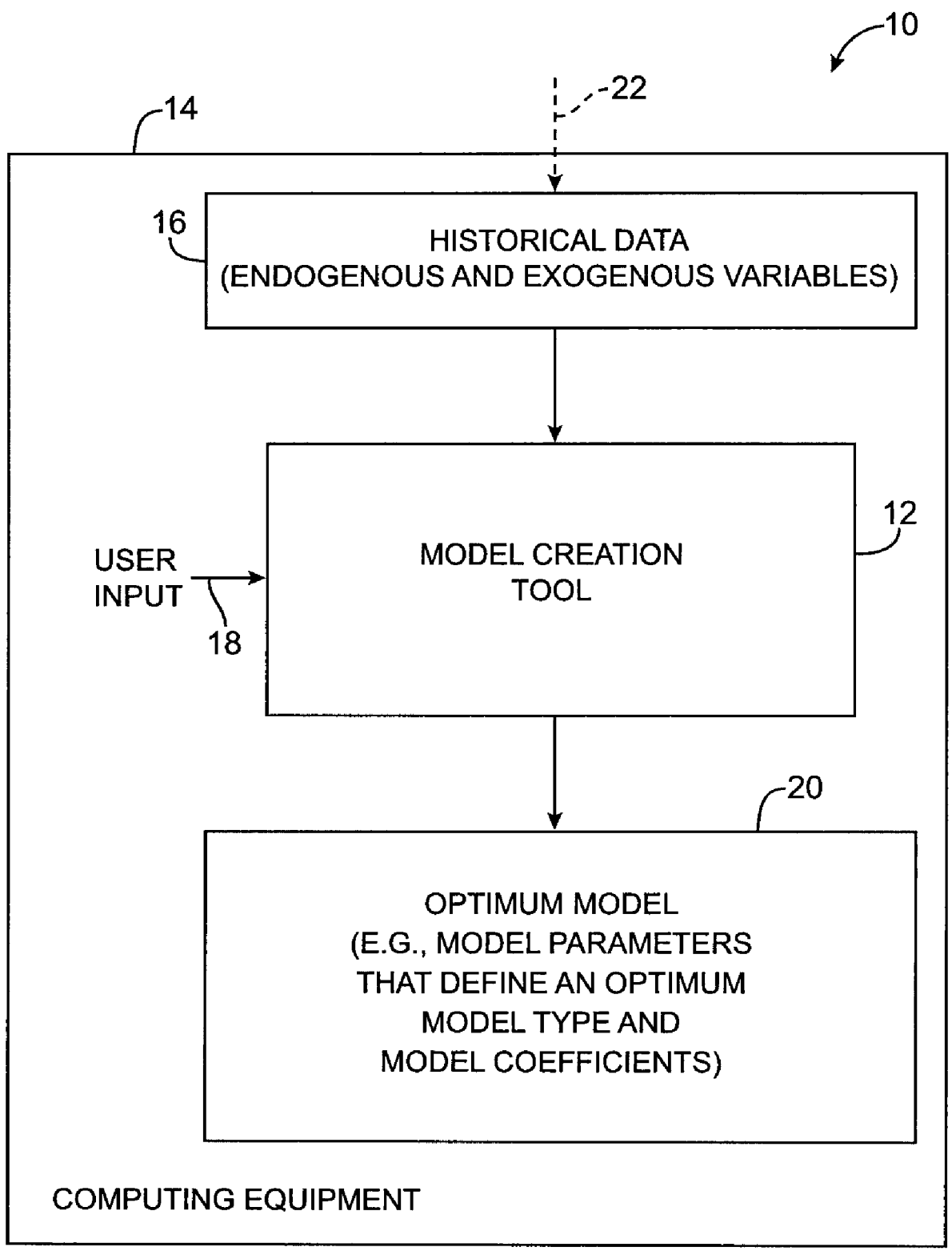
FIG. 1 is a diagram of an illustrative system environment in which a model creation tool operates in accordance with the present invention.

The present invention relates to econometric forecasting models such as price optimization models that are used by businesses to satisfy their business goals by optimizing their profits or revenues or by achieving other desired business results. More particularly, the invention relates to automatic model creation tools that generate econometric models.

Econometric models use historical data to generate forecasts. By predicting future economic effects, businesses can maximize profit or otherwise satisfy their desired business objectives. One type of econometric model that a business might use is the so-called price optimization model.

A price optimization model takes into account various tradeoffs and constraints faced by the business. One tradeoff that can be considered relates to demand. Most products have an elastic demand in that the quantity of the product that is demanded increases as a function of decreasing price. The functional relationship between the quantity of a product that is demanded and its selling price is referred to as a demand curve. A price optimization model can use demand curves to determine optimal prices.

Another tradeoff that an optimization model may take into account relates to profit margins. Not all products have the same profit margin. An organization may therefore be able to maximize profits (or satisfy other business goals) by adjusting the mix of products it sells.

Tradeoffs such as these are interrelated. For example, if an organization desires to increase profits by selling more of a high margin product, the organization will need to consider reducing that product's price to achieve a desired sales volume. Because reducing the product's price will reduce its margin, both demand elasticity and margin effects should generally be considered by the price optimization model.

Price optimization models can consider these tradeoffs in view of a number of constraints. For example, an optimization model generally can assume that the quantities of parts that are available to produce various products is limited. If more of a particular type of part is used to create a high-margin product (as an example), less of that part will be available to create a low-margin product. Constraints related to business rules such as giving priority to existing orders and ensuring that the prices of higher-grade products generally do not fall below prices for corresponding lower-grade product may also be taken into account.

Price optimization models are suitable for time-dynamic commodity markets involving marketing parameters such as type of product, price, quantity, advertising budget, etc. By considering various tradeoffs and constraints, a price optimization model can produce a forecast that is used in suggesting optimum marketing parameters for a commodity business to use in selling its product.

Econometric models such as price optimization models use historical data in generating forecasts. Historical data is generally presented in the form of time-series data. For example, historical economic data might include the price at which a particular product was sold and the quantity sold for each month of the past three years. The variables that represent the product's price and quantity are referred to as endogenous variables. External or so-called exogenous variables may also be used as inputs to the model. For example, sales data for a certain industry that is obtained from a governmental agency may be used as an exogenous input to an econometric model. As another example, sales quantities or their logarithms may be treated as either endogenous or exogenous variables.

The present invention provides a model creation tool that is used to automatically produce optimized econometric models. The optimized models that are produced have at least one endogenous variable and may have no exogenous variables or one or more exogenous variables. The models that are produced are based on time-series data.

Various mathematical formulations may be used in modeling price optimization problems and other such economic problems. An illustrative mathematical formulation that may be used is the so-called autoregressive integrated moving average (ARIMA) formulation. An ARIMA model is a general form of linear regression model that is applicable to time-dynamic economic problems. The ARIMA class has a number of subclasses. In particular, the AR (autoregressive), ARMA (autoregressive moving average), and MA (moving average) model classes are all special cases of the more general ARIMA formulation. For clarity, the automatic model generation features of the present invention are described in the context of AR models. This is merely illustrative. Automatic model creation tools in accordance with the present invention may be used to automatically create any suitable type of econometric model. The use of AR models is an example.

Econometric models such as AR models have model parameters and model coefficients. The values of the model parameters define the functional form of the model. The values of the model coefficients are selected to fit the model to the historical data. As an example, AR models are defined by an order. Using commonly accepted notation, an AR(1) model is an autoregressive model of order 1. The order is one of several model parameters that define the nature of a given AR model.

An illustrative system environment in which a model creation tool in accordance with the present invention may be used to automatically generate optimized econometric models is shown in FIG. 1.

In system 10, a model creation tool 12 is implemented on computing equipment 14. Computing equipment 14 may be based on any suitable computer or network of computers such as one or more personal computers, workstations, etc. Tool 12 is implemented by storing and running code on computing equipment 14. When the code is loaded into computing equipment 14, equipment 14 is configured to perform the automatic model creation functions of tool 12.

In a typical scenario, historical data 16 and user input 18 (e.g., user-defined configuration settings) are used as inputs to model creation tool 12. Historical data 16 may include data for endogenous and exogenous variables such as time-series data on product sale prices, product sales quantities, raw material prices, etc.

Organizations typically maintain databases that may be mined to produce historical data 16. For example, organizations often use enterprise resource planning (ERP) software packages to handle business functions such as sales and inventory functions. The sales and inventory data from an ERP database can be used as part of historical data 16. Historical data 16 may also include governmental data (e.g., industry-wide data) obtained from external sources. The operations involved in gathering historical data 16 for use by model creation tool 12 are illustrated schematically by dotted line 22 in FIG. 1.

Model creation tool 12 generates an optimized model 20 based on historical data 16 and user input 18. The specific optimized model 20 that is produced by tool 12 is defined by its model parameters (e.g., parameters such as the order of an AR model) and its model coefficients (e.g., numerical coefficients for the various terms in the model function). Model 20 is said to be an optimized or optimum model because model 20 produces minimal error in its forecasts. During the model creation process, tool 12 evaluates the error produced by various versions of the model (i.e., the forecast errors resulting from different sets of model parameters and model coefficients) and outputs only the model with the lowest error for a given set of input criteria.

Model 20 may be a single-variable model or a multivariate model. A model with a single variable may be, for example, a model that forecasts an expected price for a particular product. To cover multiple products, the model creation tool 12 can be used to automatically generate multiple corresponding models, each having a different corresponding model variable. For example, given historical price data for three products, tool 12 can automatically generate three corresponding optimum models, each of which produces price forecasts for a respective one of the products. If desired, more than one model variable may be included in a single model. In this situation, fewer models need be generated. These approaches may yield models providing divergent forecasts. The decision to utilize univariate versus multivariate models may be made prior to model construction or may be incorporated into model construction as an additional model parameter. For clarity, models with a single endogenous variable are sometimes described herein as an example.

Figure 2:
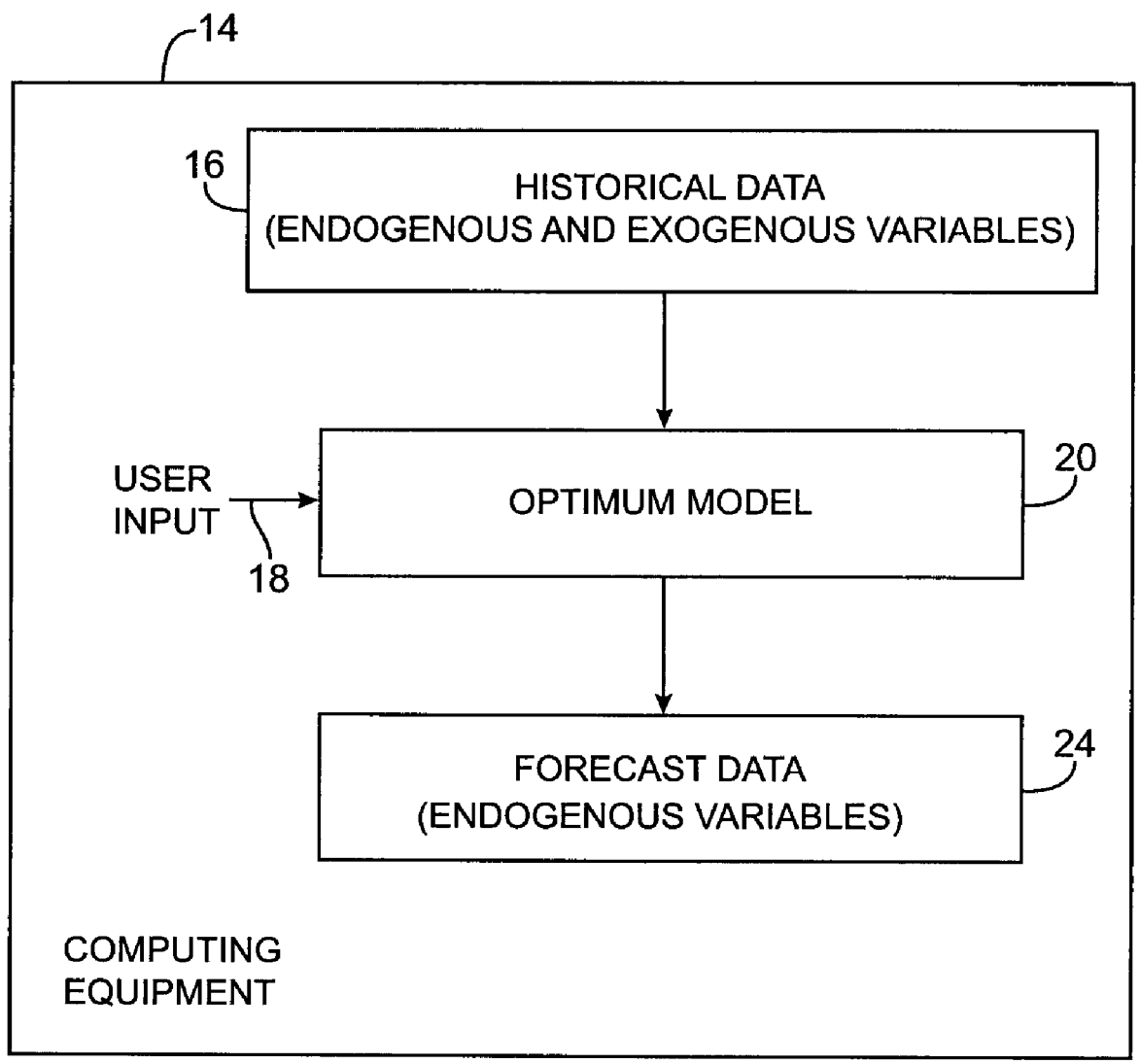
FIG. 2 is a diagram showing how an optimized model that has been created using the model creation tool of FIG. 1 may be used to generate a forecast in accordance with the present invention.

Once the model creation tool 12 has generated an optimum model 20, the model 20 may be used to generate forecasts 24 based on historical data 16 and user input 18, as shown in FIG. 2. The personnel involved in running model creation tool 12 (e.g., economic consultants) may be different than the personnel involved in running optimum model 20 to produce forecast 24 (e.g., corporate business planners). Personnel involved in using any aspect of system 10 and model 20 are referred to herein as users.

Figure 3:
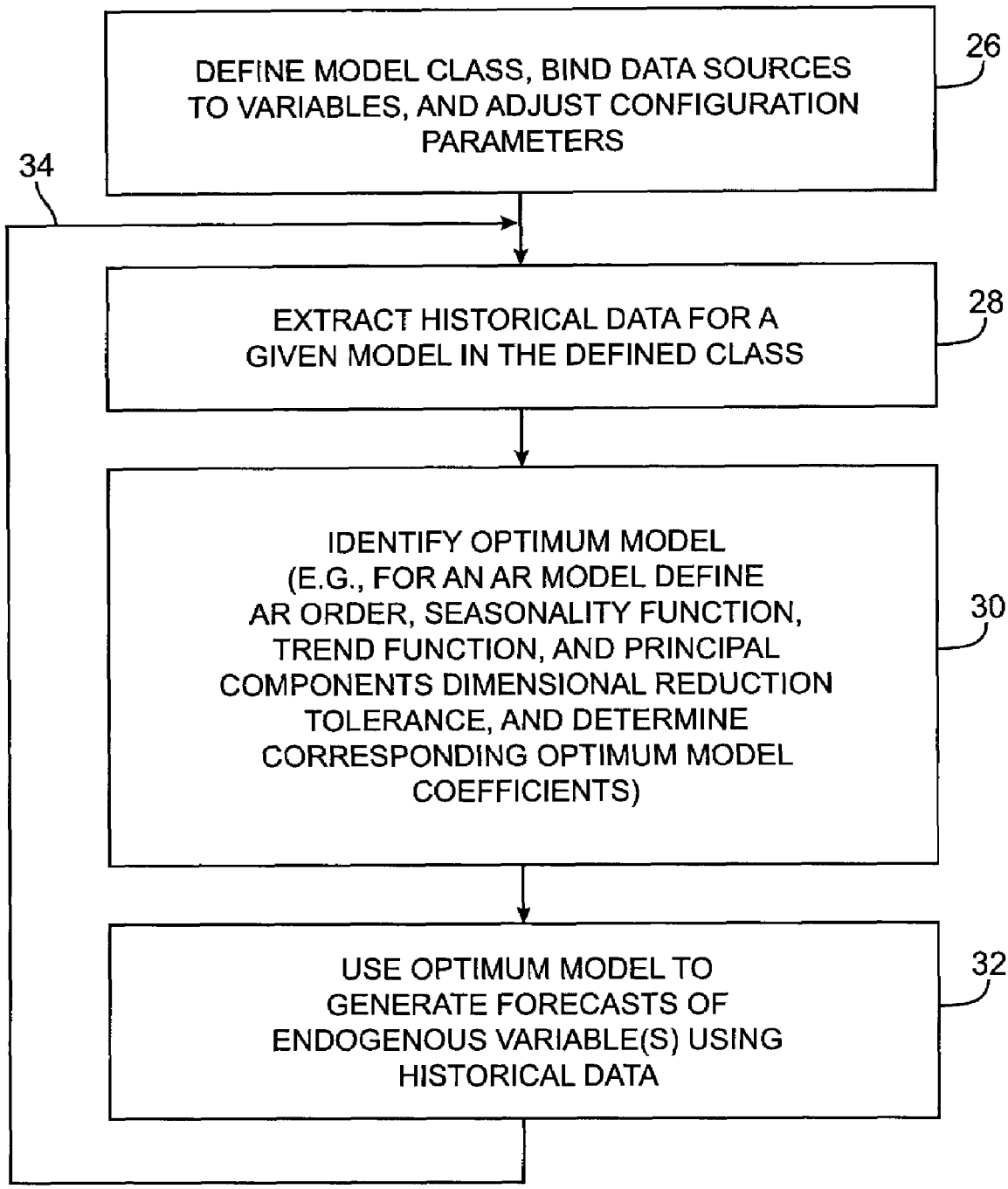
FIG. 3 is a flow chart of illustrative steps involved in using a model creation tool and an automatically-generated optimized model in accordance with the present invention.

Steps involved in using model creation tool 12 and optimum model 20 are shown in FIG. 3. Steps 26 and 28 are setup steps that are generally performed by a user prior to using the model creation tool 12. During step 26, the user defines a model class (e.g., the AR model class). A model class is a set of related models having similar data inputs and outputs.

Consider, as a first example, a model for the price of a meat product P sold by company X. United States Department of Agriculture (USDA) average price data $P_{AVG}$ for the entire meat industry is available for use as an exogenous variable. In this example, models of the defined class have one endogenous variable and one exogenous variable and are amenable to modeling using an ARIMA model in general and an AR model in particular. There is a corresponding group of products sold by company X that are suitable for modeling with the defined model class. For example, products such as brisket, New York strip, and rib eye meat products may be suitable for modeling using models in this model class.

As a second example, consider a defined model class for another group of products at company X. This group of products may include beef products such as hide, tongue, and specialty items such as a zero fat trim of New York strip. Because these products are fairly specific, there is no pertinent USDA data available for use as an exogenous variable. So, in this second example, the model class has one endogenous variable and no exogenous variables.

Step 26 involves binding data sources to variables. The process of binding the data to the variables in a given defined class of model involves identifying data sources and locations for each product in the group of products corresponding to the defined class of model.

During step 26, the user may also define model creation tool configuration parameters (e.g., by generating input 18 for model creation tool 12).

At step 28, the historical data 16 is extracted for a given model in the defined class. Commercially available data extraction and formatting software, which is sometimes referred to as business intelligence software, can be used to create a mapping between data in its raw form (e.g., data in an ERP database) and a preferred format that is recognized by the model creation tool 12. In step 26, multiple products were identified that were amenable to modeling by models in the same defined class of models. With one suitable arrangement, each product is modeled separately, so the process of extracting data during step 28 is repeated for each model that is created, as indicated by line 34.

Setup operations such as the operations described in connection with steps 26 and 28 may be performed manually prior to use of the model creation tool 12.

During step 30, the model creation tool 12 is run on computing equipment 14. The model creation tool uses the historical data for the desired product that was extracted at setup step 28 and the configuration parameters that were defined at step 26 to identify an optimum model 20. The optimum model is defined by a number of parameters and coefficients.

For example, the model 20 may be an AR model that is defined by four model parameters. These four model parameters are AR order (i.e., an integer between 0 and 10 or another suitable maximum order), seasonality function (i.e., what type of seasonality behavior is included in the model, if any), trend function (i.e., what type of non-seasonal trend is incorporated in the model, if any), and principal components dimensional reduction tolerance (typically a real number between 0 and 1). These are merely illustrative model parameters. Fewer model parameters or more model parameters may be used in defining the optimum model if desired. Collectively, the values of the model coefficients and the values of the model parameters that the model creation tool 12 identifies during step 30 define the optimum model 20.

At step 32, the optimum model 20 may be used to generate forecasts for the endogenous variable(s) based on historical data 16, as shown in FIG. 2. User input 18 such as the desired forecast horizon for a forecast and other inputs may be changed by the user each time the optimum model 20 is run. If it is desired to make forecasts for another product in the group of products amenable to modeling with a model in the defined class, a model for that product can be generated by running the model creation tool 12. The process of looping back through the operations of FIG. 3 to generate an optimum model for another product using the model creation tool 12 is shown by line 34. Because the model generation process is automated through the use of the model creation tool 12, it is possible to model tens or hundreds of different products without manually attempting to determine the optimum model parameters and model coefficients for each product.

In an alternative embodiment, the optimal model parameters and coefficients may be stored and forecasts generated on an as-needed basis with current historical data (i.e., updated data since the time of model creation). In another embodiment, only the optimal parameters may be stored with coefficients and forecasts generated on an as-needed basis.

The parameter space associated with model 20 depends on the type of mathematical formulation used for the defined model class.

In the example described in connection with step 30 of FIG. 3, the first model parameter is model order. For example, an AR model of order 1 is sometimes referred to as an AR(1) model, an AR model of order 2 is sometimes referred to as an AR(2) model, etc.

The second model parameter is the model's seasonality function. The seasonality parameter may be none (when no seasonality is desired), Holt-Winters (monthly indicators), weekly indicators, day-of-week indicators, Fourier expansion, etc.

The third model parameter is trend function. The trend function may be none (when there is no trend), linear (when the model includes a linear trend such as a linear increase or a linear decrease), or a higher order polynomial trend (identified by its order).

The fourth model parameter is the tolerance for principal components dimensional reduction. Through principal components dimensional reduction, redundant and insignificant historical data 16 is removed. If the tolerance for principal components dimensional reduction is high, the reduction in dimension will be increased.

Figure 4:
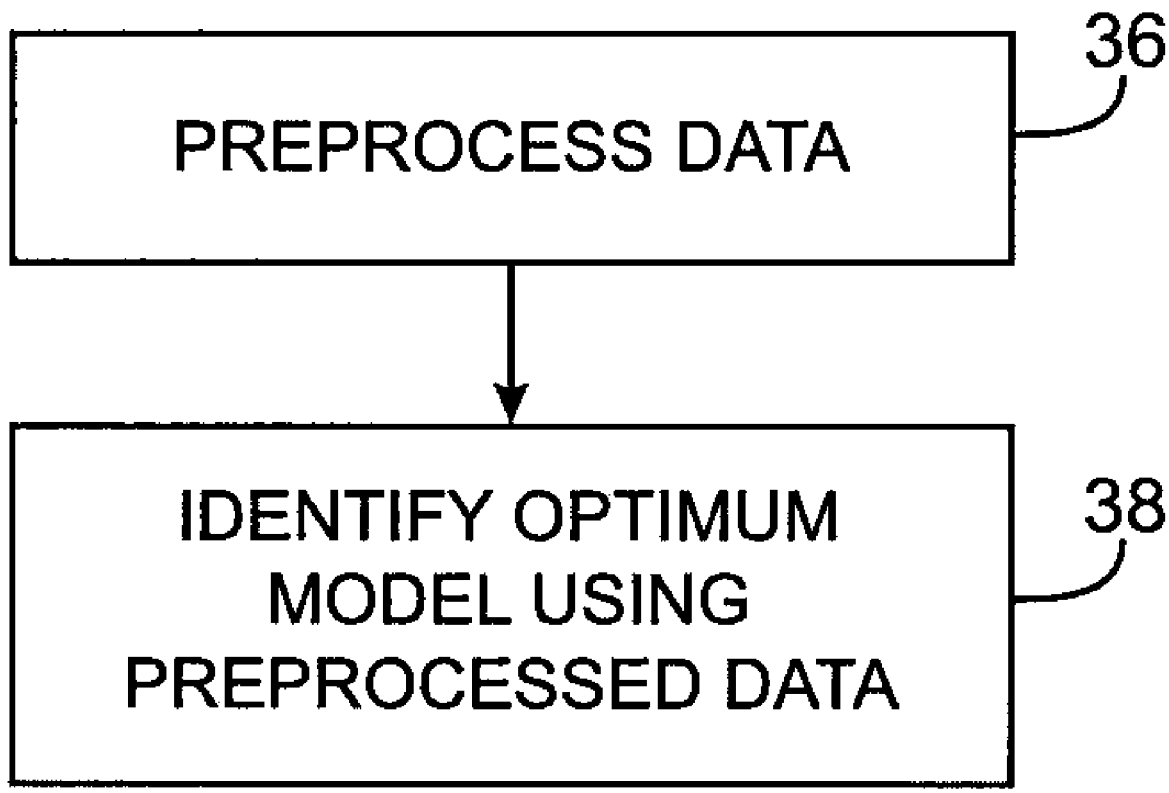
FIG. 4 is a flow chart of illustrative steps involved in identifying an optimum model using the model creation tool in accordance with the present invention.

The optimization process of step 30 may involve the substeps of FIG. 4. As shown in FIG. 4, during step 36, historical data 16 is preprocessed (e.g., by tool 12, an associated preprocessing tool, or any other suitable software). Preprocessing the data ensures that the data is valid and can be used during subsequent model creation operations. The preprocessed data produced at step 36 is used by the model creation tool 12 in identifying the optimum model 20 (step 38).

Figure 5:
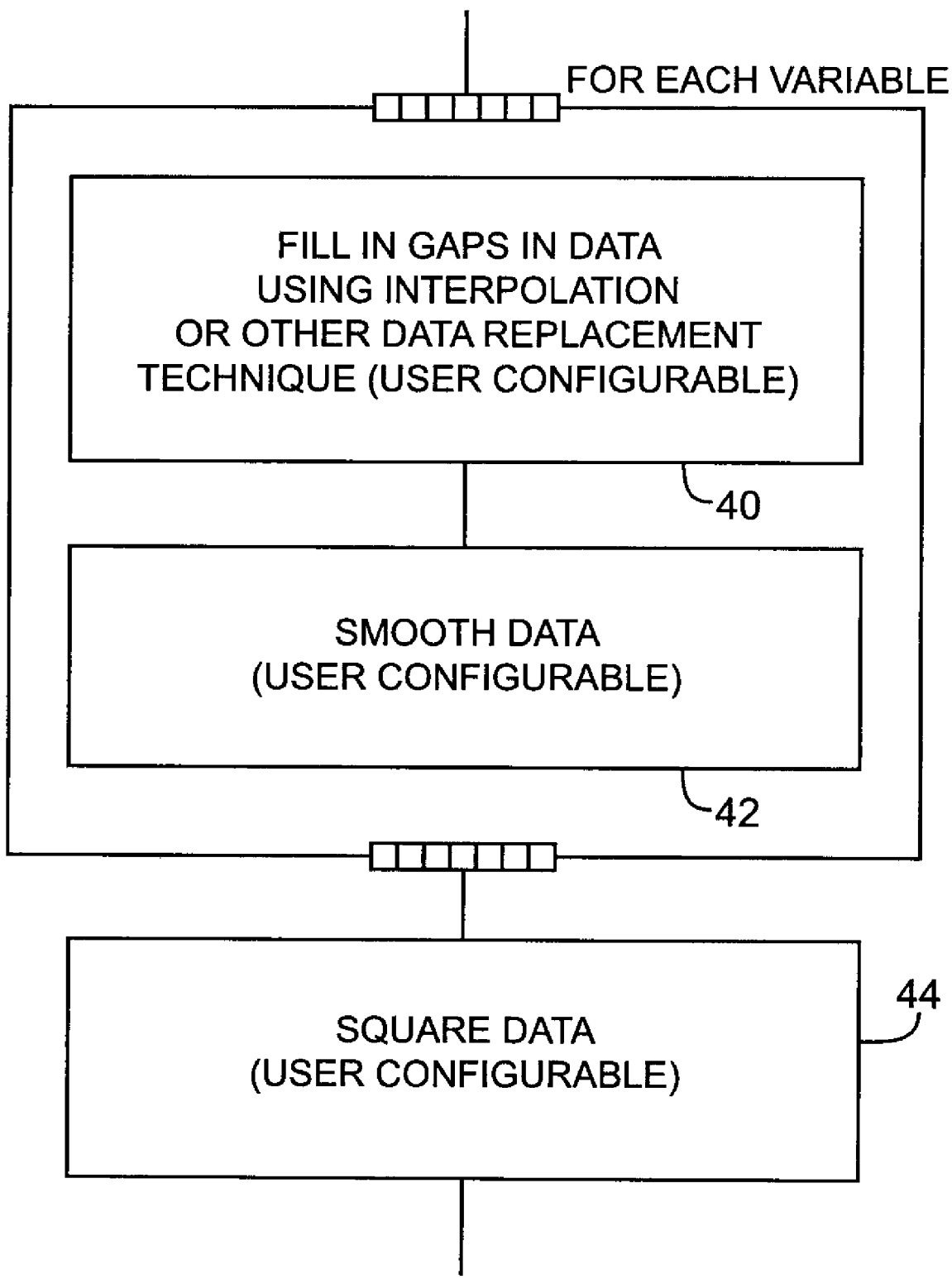
FIG. 5 is a flow chart of illustrative steps involved in pre-processing data for use when identifying an optimum model in accordance with the present invention.

In general, any suitable preprocessing operations may be performed during step 36. Illustrative steps involved with one suitable preprocessing approach are shown in FIG. 5.

During step 40, gaps in the historical data are filled using interpolation or any other suitable gap-filling technique. Illustrative gap-filling techniques that may be used during step 40 include linear interpolation and cubic spline interpolation.

During step 42, the data in which the gaps have been filled is smoothed. The amount and type of data smoothing operations that are performed at step 42 may be configured by the user (i.e., by providing appropriate configuration settings as part of user input 18).

Steps 40 and 42 are performed for each endogenous and each exogenous variable used by the model.

At step 44, the data is squared. Squaring the data ensures that all variables are defined over a suitable range (i.e., over a desired series of time periods). With one suitable squaring technique, a subset of time periods is identified during which there is valid data for each model variable. If one variable has valid data while another does not, the allowed time period range is restricted until all variables contain only valid data in the range. With another suitable squaring technique, data is extrapolated rather than being cut off. Following data squaring at step 44, all sets of time series data for the model will have the same start and end times.

With another suitable squaring technique, variables which may require time lags in the model may be allowed to have additional time periods defined to support the maximum allowed lag. These additional time periods will be prior to the start time of the other non-lagged variables.

The optimization process of step 38 of FIG. 4 uses an error metric to evaluate how well a given model is performing. The optimization process varies model parameters within an optimization space. Each parameter dimension in the allowed space may be continuous, discrete, disjoint, bounded, unbounded, semi-bounded, or any appropriate set of values. The error metric is computed within the defined optimization space. If desired, the user of the model creation tool 12 can adjust configuration settings for the model creation tool 12 that specify which error metric and optimization space are to be used during optimization.

Any suitable optimization process may be used during step 38 to identify the optimum model 20. The dimension and topology of the optimization space will influence the choice of suitable technique. An illustrative optimization technique that may be used for step 38 is shown in FIG. 6.

Figure 6:
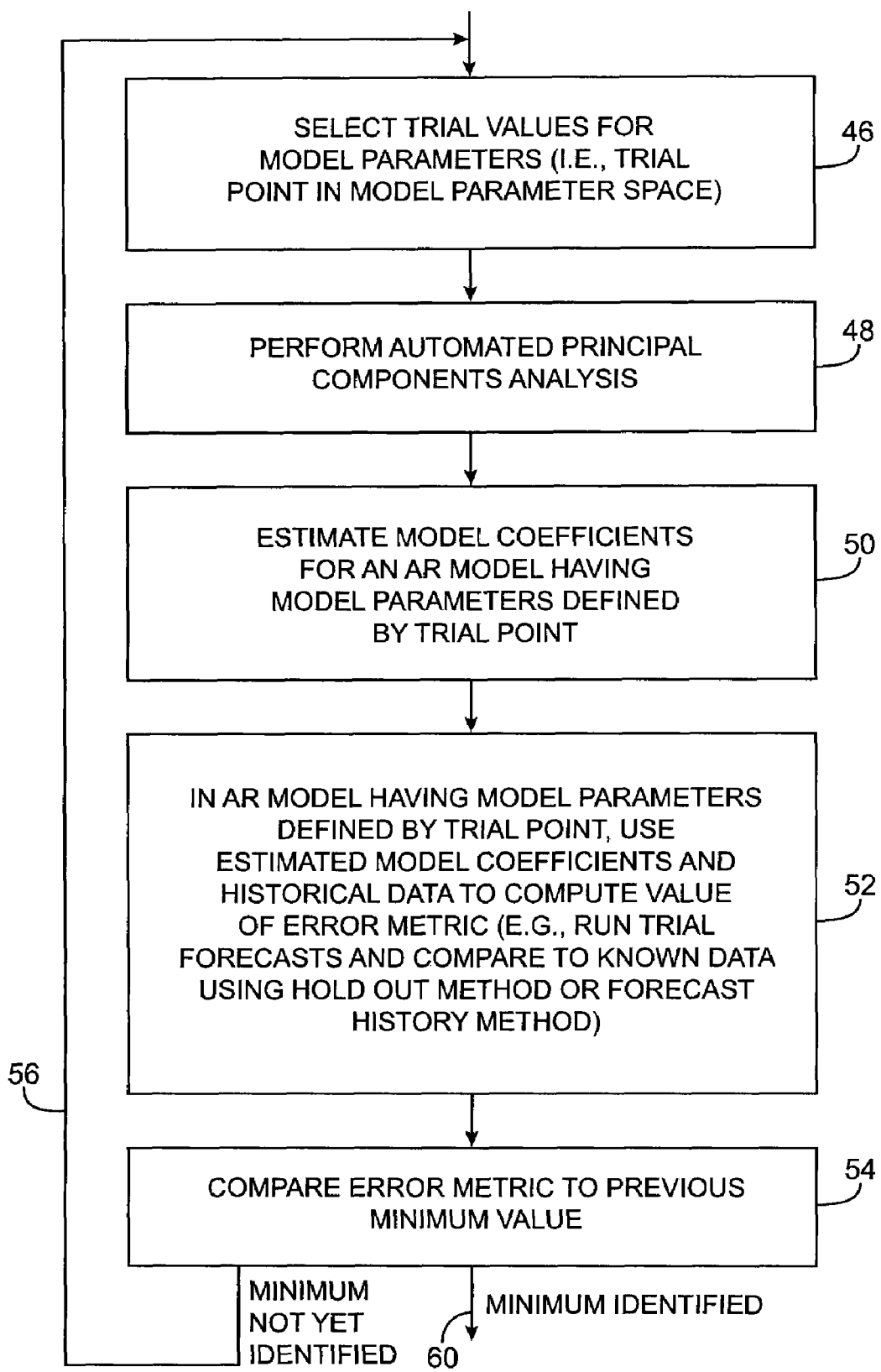
FIG. 6 is a flow chart of illustrative steps involved in using an error metric to identify an optimum model in accordance with the present invention.

At step 46 of FIG. 6, the model creation tool 12 selects trial values of the model parameters (i.e., the model creation tool 12 selects a trial point in model parameter space).

At step 48, the model creation tool 12 performs an automated principal components analysis. One benefit of this step is to reduce redundancy in the historical data to be used by the model and to eliminate insignificant data. Sometimes raw data from an organization's ERP database or other data source may contain data sets that are linearly dependent on each other. Reduction of redundancy by eliminating data that is linearly dependent on other sets of data ensures that subsequent matrix inversion operations used in estimating coefficients for the model will be possible. Elimination of redundant and insignificant data also suppresses instabilities that might otherwise arise in long-term forecasts produced by the model. These instabilities are generally produced by natural degeneracies in the regression matrix (called Z) that is used in creating the model. Because the principal components analysis of step 48 is performed automatically by model creation tool 12, sources of error that might be introduced by manually inspecting the data for redundancy are eliminated.

At step 50, the model creation tool 12 estimates the model coefficients for a model (e.g., an AR model) that has model parameters with values defined by the trial point that was selected at step 46. The coefficient estimation process of step 50 is a linear regression problem and can be solved using any technique suitable for estimating time series coefficients such as the least squares fit method. The estimated coefficients provide the model having the trial model parameters with a fit to the historical data 16.

At step 52, the model creation tool 12 uses the model coefficients that were identified at step 50 to compute a value of an error metric. The error metric is used to evaluate how well the model that has the trial model parameters from step 46 and the estimated coefficients from step 50 performs in making forecasts. The model creation tool 12 runs trial forecasts and applies the error metric to quantitatively evaluate the model's performance. Any suitable error metric arrangement may be used. With one illustrative technique, known historical data is compared to trial forecast data using the well-known hold out method. Alternatively, the model creation tool 12 may use a technique referred to as the forecast history method. The forecast history method provides enhanced performance by using an improved sample size for a given forecast horizon and a given number of time periods in the time-series historical data 16.

At step 54, the error metric value computed at step 52 is compared to the error metric values corresponding to previous trials (i.e., previous trial points in model parameter space and previous corresponding estimated model coefficients). If a minimum error metric is identified, the optimum model has been identified and the steps of FIG. 6 are complete, as indicated by line 60. If the minimum error metric has not yet been identified, processing loops back to step 46, as indicated by line 56. When processing loops back to step 46, another trial point in model parameter space may be selected and the performance of the corresponding model can be evaluated. There are many suitable algorithms for selecting the next trial point, including sequential, random, steepest descent, genetic algorithms, etc. The choice of method may affect the speed of convergence to the minimum, but it is not relevant to the overall success of the procedure. The minimum error metric can be identified by computing the error metric for all trial values in the model parameter space (e.g., by iterating through the entire space). If desired, other suitable stopping criteria may be used. For example, the evaluation process may be terminated when a trend in the error metric values makes it clear that additional trial points in unexplored regions of model parameter space will exhibit worse performance than the trial points that have already been evaluated. There are many suitable stopping criteria. These criteria combined with a particular functional form for the error metric and trial point selection method may cause the optimization to select a local rather than a global minimum. This is often acceptable depending on the requirements of the user consuming the forecasts from the model.

Figure 7:
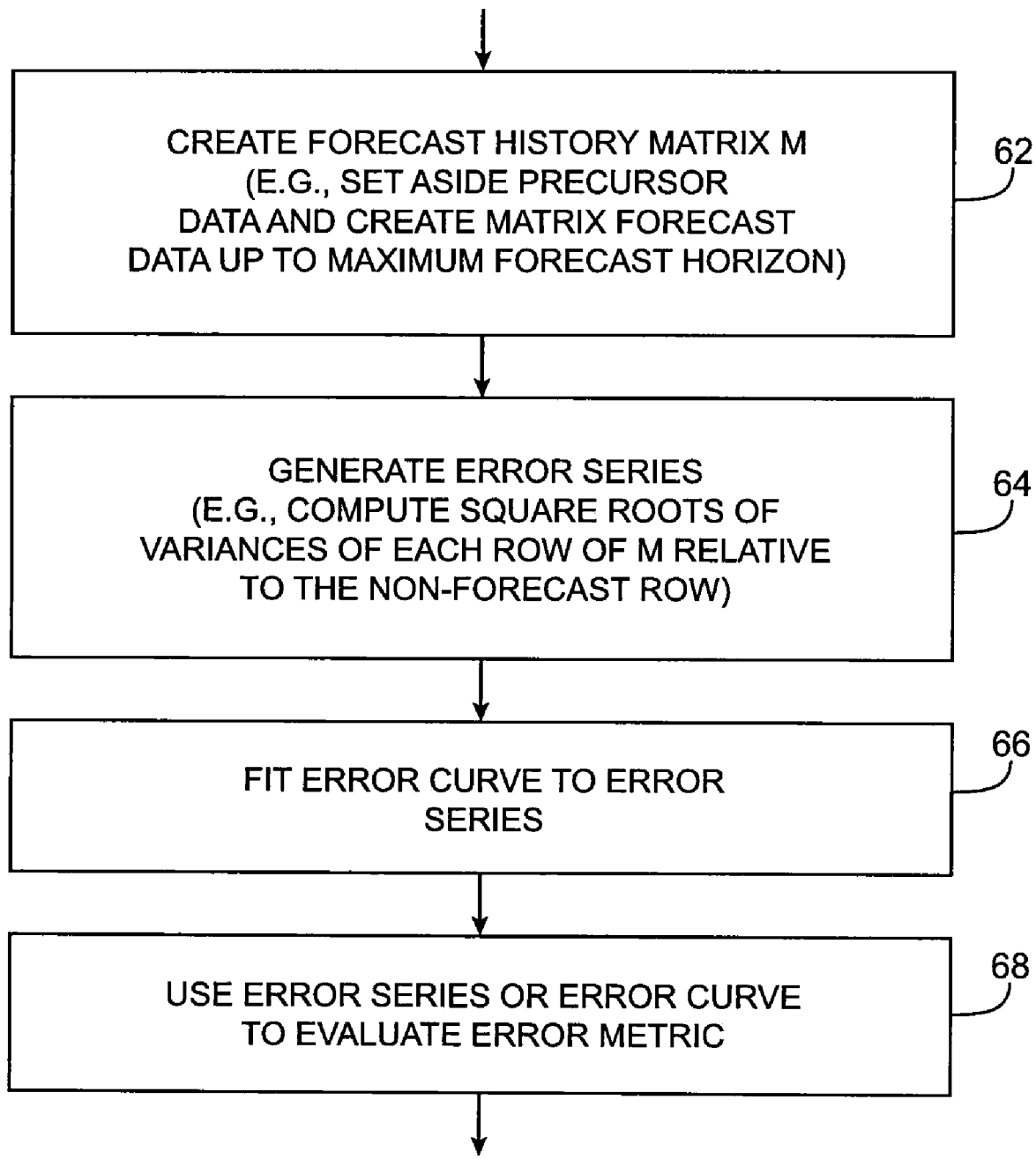
FIG. 7 is a flow chart of illustrative steps involved in using a forecast history matrix in evaluating an error metric to select an optimum model in accordance with the present invention.

Illustrative steps involved in using the forecast history method to evaluate the error metric during step 52 of FIG. 6 are shown in FIG. 7. In the example of FIG. 7, the model that is being evaluated is an AR model having one endogenous variable f. The order of the AR model is 2. Variable f is represented by historical time series data 16. The subscripts of variable f (i.e., $f_1$, $f_2$, $f_3$ . . . ) represent time periods. For example, each subscript may represent a different month. If f represents the price of a product, $f_1$ may represent the price of the product in January, $f_2$ may represent the price of the product in February, etc. There may be any suitable number of elements of time series data f in the historical data 16. For example, there may be several years of monthly data. Data may also be presented using other time periods (e.g., weekly time periods, daily time periods, etc.).

In FIG. 7, the performance of a trial model is evaluated using a maximum forecast horizon of three time periods (e.g., three months). In general, the size of the forecast horizon may be adjusted by the user (i.e., the forecast horizon may be a user-selectable configuration parameter for the model creation tool 12).

Figure 8:
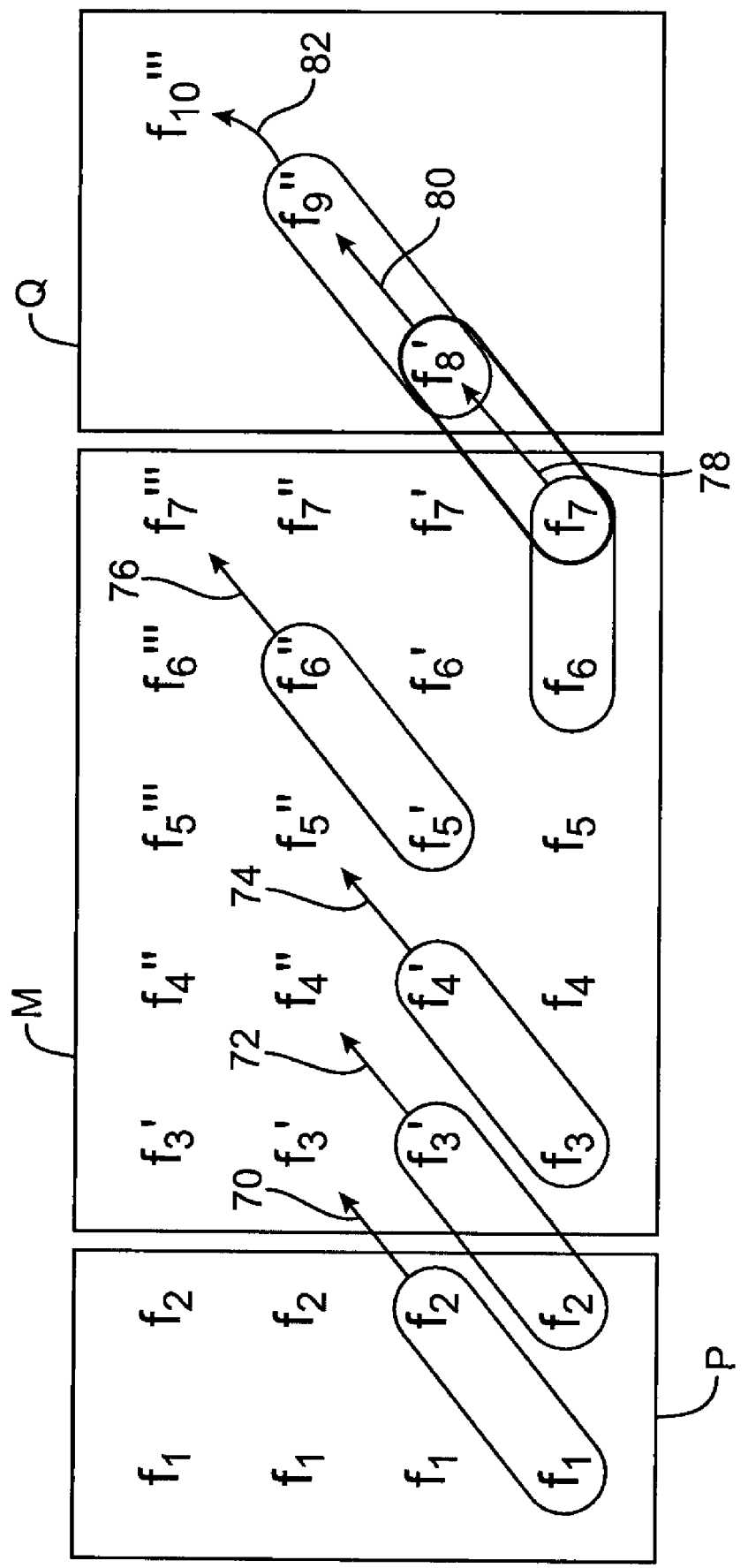
FIG. 8 is a diagram of an illustrative forecast history matrix in accordance with the present invention.

At step 62, model creation tool 12 uses the trial model and the historical data 16 to create a forecast history matrix M. The matrix creation process is illustrated in FIG. 8. In FIG. 8, the bottom row of data f represents known historical data (for time periods 1-7 in this example). The second row from the bottom is constructed using forecasts that are one time period in the future (i.e., that have a forecast horizon of 1). In the notation of FIG. 8, data elements that have been produced using a model forecast with a forecast horizon of one are represented as $f_1'$, $f_2'$, etc., data elements with a forecast horizon of 2 are represented as $f_1''$, $f_2''$, etc., and data elements that have a forecast horizon of 3 are represented as $f_1'''$, $f_2'''$, etc.

The trial model being used in this example is an AR(2) model, so two prior time periods are used in generating each forecast element. As an example, forecast data element $f_3'$ is produced by using elements $f_1$ and $f_2$ as model inputs, as indicated by line 70, forecast data element $f_4'$ is produced using data elements $f_2$ and $f_3'$, as indicated by line 72, forecast data element $f_5''$ is produced using data elements $f_3$ and $f_4'$, as indicated by line 74, and forecast data element $f_7'''$ is produced using data elements $f_5'$ and $f_6''$. In the second row from the bottom row of elements, the data elements are produced using a forecast horizon of one. For example, element $f_8'$ is produced from $f_6$ and $f_7$, as indicated by line 78. In the third row from the bottom, the data elements are produced using a forecast horizon of two. For example, element $f_9''$ is produced from $f_7$ and $f_8'$, as indicated by line 80. Line 82 indicates how the elements in the uppermost row (fourth from the bottom) are produced using a forecast horizon of three (i.e., $f_{10}'''$ is produced by the trial model using elements $f_8'$ and $f_9''$ as inputs).

In FIG. 8, the precursor data P (elements $f_1$ and $f_2$) represent known data and have not been produced by the model. It is not possible to produce an AR(2) forecast for time periods one and two, because no historical data is available for earlier time periods. In creating the forecast history matrix M, the precursor data P in FIG. 8 is set aside. The forecast data Q (i.e., elements f8', f9", and f10''') represents future-time-period forecast data of the type that the user of the optimum model will use in business planning. When evaluating the performance of the trial model, however, elements such as elements f8', f9", and f10''' cannot be compared against known data, because there is no known data past time period 7 (in this example). As a result, data Q is not used in constructing the forecast history matrix M. The elements f from time period 3 to time period 7 in matrix M are filled in by making appropriate forecasts using the trial model.

An alternative definition of the forecast history matrix M is obtained by excluding the first four time periods. The general formula is ((AR order)+(maximum horizon)−1). This definition excludes all elements from M that do not have sufficient history to create a forecast. In general, the number of time periods in the history is sufficiently large that the difference in error metric between this definition and the previous definition is negligible.

At step 64, an error series is generated that represents how well the forecasts $\{f_1', f_2' \ldots\}$, $\{f_1'', f_2'' \ldots\}$, and $\{f_1''', f_2''' \ldots\}$ compare to the known historical data $\{f_1, f_2 \ldots\}$. This series is indexed by the forecast horizon; in this example, the indices are $\{1, 2, 3\}$. Any suitable technique may be used to compute the error series. With one suitable approach, the model creation tool 12 computes the square roots of the sample variances of each row of M relative to the non-forecast (bottom) row. In the first row, for example, the model creation tool 12 computes an error value of $(\Sigma_i(f_i'-f_i)^2/3)^{1/2}$, where the summation runs from i=3 to 7. Because there are three rows of forecast data in matrix M, there are three error values in the error series for matrix M of FIG. 8.

Figure 9:
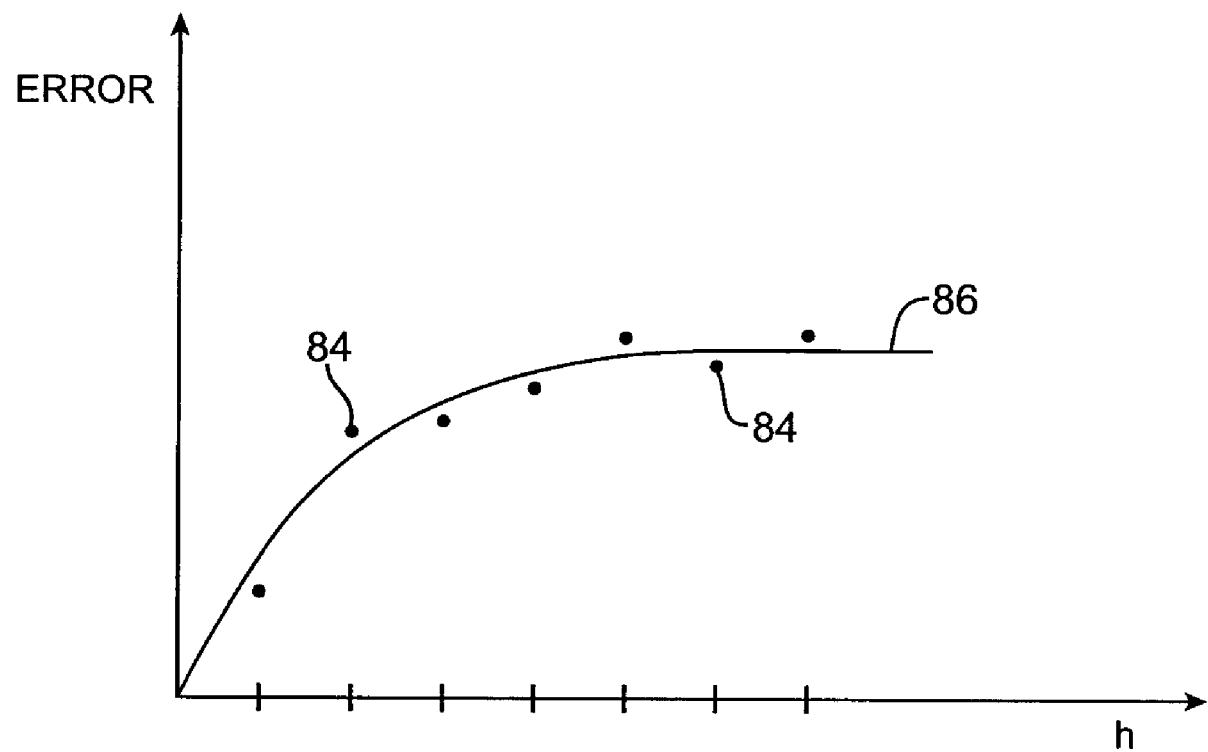
FIG. 9 is a graph showing an error series and error curve that may be generated when evaluating an error metric to select an optimum model in accordance with the present invention.

At step 66 of FIG. 7, the model creation tool 12 fits an error curve to the error series. An illustrative error series made up of points 84 and a corresponding error curve 86 are shown in FIG. 9, plotted against various values of the forecast horizon h. In the example of FIG. 9, the error series has seven error values, because the maximum forecast horizon being considered is seven time periods. In the example of FIG. 8, there are three error values in the series.

At step 68 of FIG. 7, the error series or the error curve may be used to evaluate the error metric and produce a single corresponding error metric error value. With one suitable approach, the error series or error curve may be evaluated at the maximum forecast horizon. With another suitable approach, the error series or curve is evaluated over a range of forecast horizon values (e.g., part or all of the series or curve). The evaluation might be the maximum, the sum, or the root mean square over the interval. These are merely illustrative techniques. Any suitable technique for evaluating the error series to produce a single error metric value may be used if desired.

Figure 10:
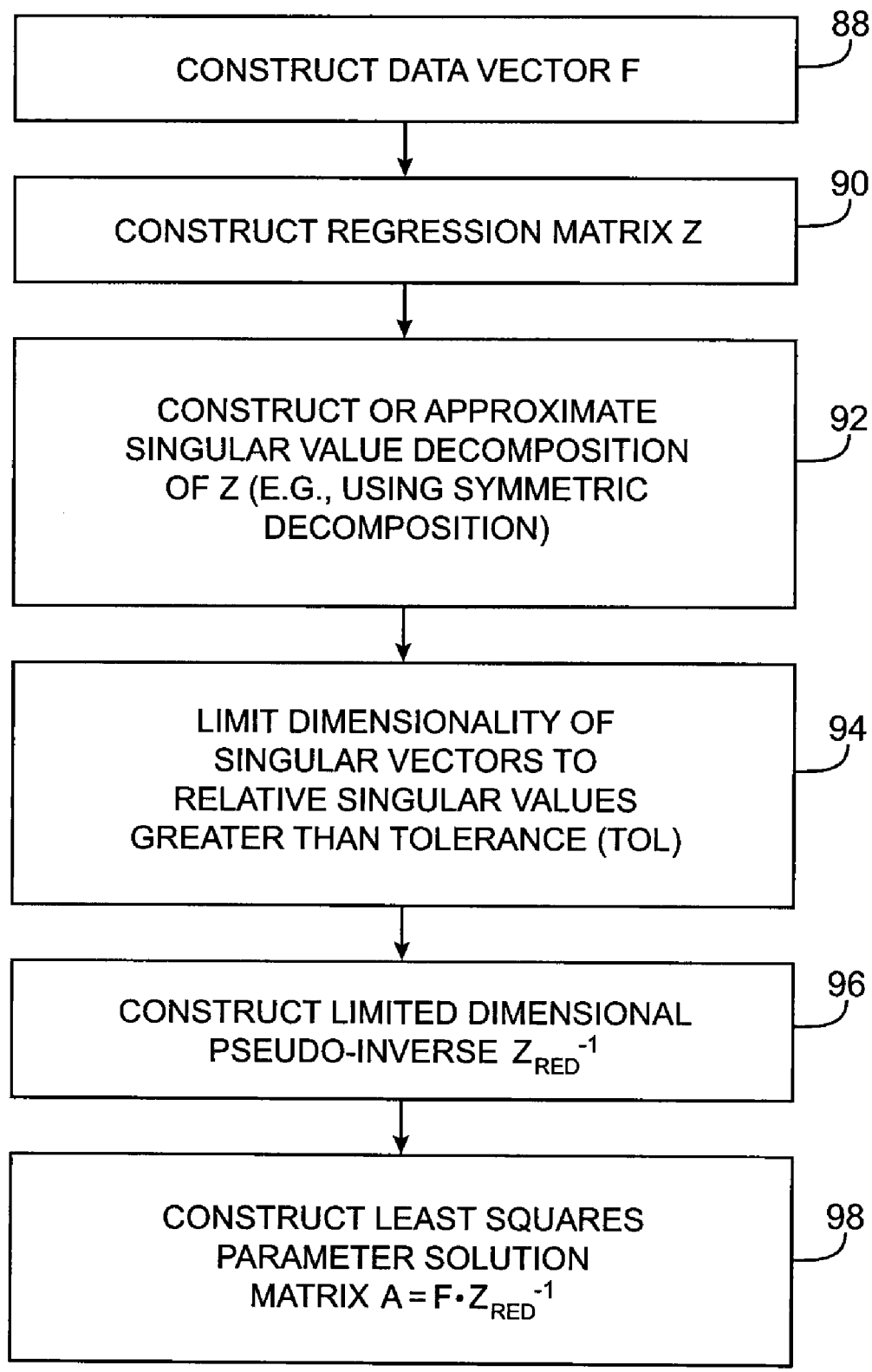
FIG. 10 is a flow chart of illustrative steps involved in performing an automated principal components analysis and estimating model coefficients in accordance with the present invention.

Illustrative steps involved in performing the automated principal components analysis of step 48 and the model coefficient estimation of step 50 of FIG. 6 are shown in the flow chart of FIG. 10.

The basic form of an AR model defined by the trial point in model parameter space is given by equation 1.

$$f_t + w_t = a \cdot X_t + \Sigma_n b_n f_{t-n} \qquad (1)$$

In equation 1, the summation is taken from n=1 to N, where N is the auto-regressive order of the AR model. The variable $f_t$ represents the endogenous variable to be modeled (evaluated at time period t). The variable $w_t$ is the corresponding random error (at time t). The vector $X_t$ represents a vector of exogenous variables. The exogenous variables in this example include seasonality, trend, and external data.

The model coefficients (regression coefficients) to be estimated from historical data $f_t$ are represented by a and $b_n$ in equation 1. A least squares technique or other suitable technique may be used to estimate the model coefficients. A least squares estimate caries with it the assumption that the random errors $w_t$ are normally distributed (i.e., distributed with a Gaussian distribution).

If desired, a coefficient estimation technique can be used that involves a non-standard projection method for performing estimation. This non-standard projection method is advantageous for a several reasons. First, the forecasting requirements for the model are fairly extreme in that the model structure should generally accommodate both short-term forecasts (i.e., weekly forecasts) and forecasts with horizons of a year or more. Classic estimation techniques are generally concerned with short-term forecasts, even though stability in extended forecasts is highly desirable. With the non-standard projection method, the stability of longer term forecasts can be tuned and balanced against model accuracy if desired.

The non-standard projection method is used in the steps of FIG. 10.

At step 88 of FIG. 10, the model creation tool 12 computes the vector F using equation 2. (The elements of F are the values $f_t$ in equation 1).

$$F = A \cdot Z \qquad (2)$$

The matrix A is formed by concatenating a and $b_j$. Following concatenation, matrix A includes the following elements: EXO1, EXO2, . . . EXON, (the coefficients of exogenous variables 1-N, which form a portion of a), ENDO_LAG1 . . . ENDO_LAGR (the coefficients of the lagged endogenous variable—i.e., lagged f values, which form the $b_j$), SEASONAL_1 . . . SEASONAL_P (coefficients of exogenous seasonal functions 1-P, which form a portion of a), and TREND_1 . . . TREND R (coefficients of exogenous trend functions, which form a portion of a).

At step 90, the model creation tool 12 computes the regression matrix Z. The regression matrix Z is formed from a concatenation of $X_t$ and $f_{t-n}$. The matrix Z as shown in FIG. 11. Each column of the matrix Z contains elements corresponding to a different time period. Any suitable concatenation ordering for creating A and Z is acceptable provided that the ordering is consistent for both matrices. For multivariate problems (i.e., more than one endogenous variable), creating a suitable ordering is more involved but is straightforward.

Assuming that $f_t$ has been observed over a long time, the matrices F and Z have very high aspect ratios (i.e., they are much wider than they are long), which presents an overdetermined matrix problem.

At step 92, the model creation tool 12 computes the Singular Value Decomposition (SVD) of Z. Any suitable technique may be used to compute or approximate the SVD of Z.

One possible approach to solving for the parameter matrix A involves the use of equation 3.

$$A = F \cdot Z^{-1} \qquad (3)$$

In equation 3, $Z^{-1}$ denotes the pseudo-inverse. The pseudo-inverse in equation 3 may be calculated using the well-known SVD algorithm that is available in commercial math packages. In this case, the dimensional reduction of step 94 may have been bypassed.

Because Z has a high aspect ratio, the standard pseudo-inverse algorithm can be inefficient. A more efficient solution uses a symmetric decomposition method to increase solution speed at the expense of some precision. With this approach, the SVD can be written as $Z = L \cdot D \cdot R^T$, where D is diagonal, real and non-negative and where the superscript T denotes a transposed matrix. The matrices L and R are ortho-normal, so that $L^T \cdot L = R^T \cdot R = I$, the identity matrix. The pseudo-inverse is then $Z^{-1} = R \cdot D^{-1} \cdot L^T$, where the inverse of D is easily computed. In the high-aspect-ratio case, we observe that the second power of Z, $Z \cdot Z^T$, is relatively small, symmetric and positive definite with the SVD equivalent to an eigenvalue decomposition given by equation 4.

$$Z \cdot Z^T = L \cdot D^2 \cdot L^T \qquad (4)$$

The decomposition of $Z \cdot Z^T$ in equation 4 may be computed by the model creation tool 12 more rapidly than the SVD of Z because of its reduced size.

The matrix R ($R^T$) can be constructed using equation 5.

$$R^T = D^{-1} \cdot L^T \cdot Z \qquad (5)$$

With L and D from equation 4 and with $R^T$ from equation 5, the model creation tool has computed the SVD of Z.

At step 94, the model creation tool 12 performs a principal components dimension reduction. Care should be taken when there are small or zero values in D, i.e., when $(\min(D_{ii})/\max(D_{ii})) \ll 1$. This situation arises when there is insufficient distinction between the time dependence of the forcing variables. For example, this situation arises when $X_{it} \approx c \cdot f_{j(t-1)}$ for some i and j and all t. In this case, because D is inverted to obtain A, a spurious component is magnified. Because A is, in effect, repeatedly applied to $f_t$ to generate forward forecasts $f_{t+1}$, $f_{t+2}$, etc., the growth of this spurious component will be geometric with increasing forecast horizon. Use of the projection formulation allows the model creation tool 12 to avoid this instability using a tolerance (TOL) for the pseudo inverse. Diagonal values of size less than tolerance TOL relative to the largest value are eliminated, thereby suppressing the instability. TOL is one of the model parameters for which the model creation tool 12 identifies an optimum value.

At step 96, the model creation tool 12 constructs a limited dimensional pseudo inverse $Z_{RED}^{-1}$ using equation 6.

$$Z_{RED}^{-1} = R_{RED} \cdot D_{RED}^{-1} \cdot L_{RED}^T \qquad (6)$$

In equation 6, the subscript RED indicates reduced dimensionality. These matrices are constructed by eliminating the previously-defined small singular values from D as well as their corresponding left and right singular vectors from L and R.

At step 98, the solution is constructed by the model creation tool 12 using equation 7.

$$A = F \cdot Z_{RED}^{-1} \qquad (7)$$

This solution may then be used to create the forecast history matrix M, as described in connection with step 62 of FIG. 7.

In the approach of FIG. 10, steps 88 and 90 represent setup operations. Steps 92, 94, 96, and 98 represent operations involved in performing a combined automated principal components analysis and least squares estimation. Step 92 may be considered to be a precursor step. Step 94 is an example of an illustrative way in which to perform step 48 of FIG. 6. Steps 96 and 98 are an example of an illustrative way in which to perform step 50 of FIG. 6.

The empirical approach used by the model creation tool 12 has a number of benefits. For example, underlying most analytic econometric modeling approaches is the need to simplify by assuming that the modeled process is stationary. (An example of a non-stationary process is a random walk.) Because the model creation tool 12 uses an empirical approach, it is not necessary to make this simplifying assumption. Saturation of the error metric need not be a model requirement when model creation tool 12 identifies the optimum model 20 for a given problem.

Moreover, conventional analytic econometric modeling techniques typically impose restrictions on model coefficients to ensure stability. This stability requirement is related to the zeros of certain polynomials related to the exact form of the lag operators for the model. The empirical approach used by the model creation tool 12 does not impose restrictions on the locations of these zeros. The coefficient estimation process implemented by the model creation tool 12 therefore can be used in the context of both stationary and non-stationary models.

The foregoing is merely illustrative of the principles of this invention and various modifications can be made by those skilled in the art without departing from the scope and spirit of the invention.

What is claimed is:

1. A method for using an econometric model creation tool implemented on computing equipment to automatically create an optimum econometric model that generates an economic forecast over a forecast horizon based on a given set of historical data, wherein the model is defined by model parameters and model coefficients, the method comprising:

selecting a plurality of trial sets of model parameters for the model using the model creation tool implemented on the computing equipment;

estimating model coefficients for the model defined by each set of trial model parameters using the model creation tool implemented on the computing equipment;

with the model creation tool implemented on computing equipment, using the estimated model coefficients and the given set of historical data in the model that is defined by each set of trial parameters to generate a corresponding error metric value that is indicative of how well that model generates forecasts;

with the model creation tool implemented on computing equipment, using the error metric values to identify which of the sets of trial parameters and estimated model coefficients defines the optimum model; and using the model creation tool implemented on computing equipment to perform an automated principal components analysis on the given set of historical data.

2. The method defined in claim 1
wherein using the model creation tool to perform the automated principal components analysis and estimating the model coefficients comprises constructing a singular value decomposition of a regression matrix.

3. The method defined in claim 1 wherein estimating the model coefficients comprises constructing a limited dimensional pseudo-inverse matrix.

4. The method defined in claim 1 wherein using the estimated model coefficients and the given set of historical data in the model that is defined by each set of trial parameters to generate the corresponding error metric value comprises creating forecast history matrices from the given set of historical data.

5. The method defined in claim 1 wherein using the estimated model coefficients and the given set of historical data in the model that is defined by each set of trial parameters to generate the corresponding error metric value comprises creating forecast history matrices from the given set of historical data and computing variances between elements in different rows in the forecast history matrices.

6. The method defined in claim 1 wherein the model is an autoregressive (AR) model having an AR order, wherein the order of the AR model is one of the model parameters in each set of trial model parameters, and wherein using the error metric values to identify which of the sets of trial parameters and estimated model coefficients defines the optimum model comprises identifying an optimum AR order.

7. The method defined in claim 1 wherein each set of trial model parameters includes a seasonality function parameter and wherein using the error metric values to identify which of the sets of trial parameters and estimated model coefficients defines the optimum model comprises identifying an optimum seasonality function parameter.

8. The method defined in claim 1 wherein each set of trial model parameters includes a trend function parameter and wherein using the error metric values to identify which of the sets of trial parameters and estimated model coefficients defines the optimum model comprises identifying an optimum trend function parameter.

9. The method defined in claim 1 wherein each set of trial model parameters includes a principal components dimensional reduction tolerance parameter and wherein using the error metric values to identify which of the sets of trial parameters and estimated model coefficients defines the optimum model comprises identifying an optimum principal components dimensional reduction tolerance parameter.

10. The method defined in claim 1 wherein each set of trial model parameters includes an autoregressive model order parameter, a seasonality function parameter, a trend function parameter and wherein using the error metric values to identify which of the sets of trial parameters and estimated model coefficients defines the optimum model comprises identifying an optimum autoregressive model order parameter, an optimum seasonality function parameter, and an optimum trend function parameter.

11. The method defined in claim 1 wherein estimating the model coefficients comprises constructing a pseudo-inverse matrix.

12. The method defined in claim 1
wherein using the model creation tool to perform the automated principal components analysis and estimating the model coefficients comprises constructing an approximate singular value decomposition of a regression matrix, wherein constructing the singular value decomposition comprises constructing a symmetric eigenvalue decomposition of a power of the regression matrix.

* * * * *